(12) United States Patent
Kimura et al.

(10) Patent No.: US 8,319,740 B2
(45) Date of Patent: Nov. 27, 2012

(54) DISPLAY CONTROL APPARATUS

(75) Inventors: Masahiko Kimura, Misuho (JP); Ryoji Yamaguchi, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 406 days.

(21) Appl. No.: 12/412,216

(22) Filed: Mar. 26, 2009

(65) Prior Publication Data
US 2009/0244030 A1 Oct. 1, 2009

(30) Foreign Application Priority Data
Mar. 26, 2008 (JP) ................................. 2008-079894

(51) Int. Cl.
*G06F 3/041* (2006.01)
(52) U.S. Cl. ......... 345/173; 345/174; 345/156; 345/168
(58) Field of Classification Search .................. 345/619, 345/168, 156, 173, 174; 348/333.12
See application file for complete search history.

(56) References Cited

U.S. PATENT DOCUMENTS

| | | | | |
|---|---|---|---|---|
| 5,189,732 A * | 2/1993 | Kondo | ........................... | 715/840 |
| 5,706,030 A * | 1/1998 | Ishigami et al. | .............. | 345/168 |
| 5,936,619 A * | 8/1999 | Nagasaki et al. | .............. | 345/205 |
| 6,411,285 B1 * | 6/2002 | Miyazawa | ..................... | 345/173 |
| 6,504,530 B1 * | 1/2003 | Wilson et al. | ................. | 345/173 |
| 6,778,217 B1 * | 8/2004 | Nishimura | ............... | 348/333.12 |
| 6,963,487 B2 * | 11/2005 | Billington et al. | ....... | 361/679.41 |
| 7,016,711 B2 * | 3/2006 | Kurakane | .................... | 455/575.1 |
| 7,054,148 B2 * | 5/2006 | Chen et al. | ................. | 361/679.4 |
| 7,554,524 B2 * | 6/2009 | Music | ........................... | 345/156 |
| 7,995,075 B2 * | 8/2011 | Yang et al. | ..................... | 345/619 |
| 2002/0008692 A1 * | 1/2002 | Omura et al. | ................. | 345/173 |
| 2003/0012579 A1 * | 1/2003 | Takahashi et al. | .............. | 399/81 |
| 2003/0064758 A1 * | 4/2003 | Mizuta et al. | ................. | 455/566 |
| 2005/0002160 A1 * | 1/2005 | Chen et al. | .................... | 361/683 |
| 2007/0030256 A1 * | 2/2007 | Akaike et al. | ................. | 345/173 |
| 2007/0091074 A1 * | 4/2007 | Nashiki et al. | ................ | 345/173 |
| 2007/0097096 A1 * | 5/2007 | Rosenberg | .................... | 345/173 |

(Continued)

FOREIGN PATENT DOCUMENTS
JP H05-233130 A 9/1993
(Continued)

OTHER PUBLICATIONS

Japan Patent Office, Notice of Reasons for Rejection for Japanese Patent Application No. 2008-079894 (counterpart to above-captioned patent application), mailed Jun. 1, 2010.

*Primary Examiner* — Thuy Pardo
(74) *Attorney, Agent, or Firm* — Baker Botts L.L.P.

(57) ABSTRACT

A display control apparatus includes a main body and a display unit with a touch panel. The display control apparatus further includes a memory that stores a plurality of detection condition parameters for detecting a touch operation to the touch panel. The plurality of detection condition parameters are corresponding to each of a plurality of locations or a plurality of orientations of the touch panel. The display control apparatus further includes a state detector that detects a current location or a current orientation of the touch panel. The display control apparatus still further includes a condition selector that selects one of the plurality of detection condition parameters corresponding to the current location or the current orientation. Moreover, the display control apparatus includes a touch determiner that determines a touch to the touch panel by using the selected one of the plurality of detection condition parameters.

7 Claims, 7 Drawing Sheets

U.S. PATENT DOCUMENTS

| | | | |
|---|---|---|---|
| 2008/0218481 A1* | 9/2008 | Watabe et al. | 345/168 |
| 2008/0291173 A1* | 11/2008 | Suzuki | 345/173 |
| 2008/0303801 A1* | 12/2008 | Akaike et al. | 345/173 |

FOREIGN PATENT DOCUMENTS

| | | |
|---|---|---|
| JP | H07-143261 A | 6/1995 |
| JP | H08-221207 A | 8/1996 |
| JP | 2002-267406 A | 9/2002 |
| JP | 2003-019846 A | 1/2003 |
| JP | 2003-143339 A | 5/2003 |
| JP | 2005-018669 A | 1/2005 |
| JP | 2005-096519 A | 4/2005 |
| JP | 2007-027034 A | 2/2007 |
| JP | 2007-128408 A | 5/2007 |

* cited by examiner

| (A) | (B) |
|---|---|
| (C) | (D) |
| (E) | (F) |
| (G) | (H) |

| LOCATION | THRESHOLD LEVEL | DETECTION REGION (1) | DETECTION REGION (2) |
|---|---|---|---|
| (1) | 20 | (E)(F)(G)(H) | (C)(D)(E)(F)(G)(H) |
| (2) | 50 | (C)(D)(E)(F) | (C)(D)(E)(F) |
| (3) | 50 | (C)(D)(E)(F) | (C)(D)(E)(F) |
| (4) | 50 | (C)(D)(E)(F) | (C)(D)(E)(F) |

Fig. 9

| GRADIENT ANGLE | THRESHOLD LEVEL | DETECTION REGION (1) | DETECTION REGION (2) |
|---|---|---|---|
| 10 | 70 | (E)(F)(G)(H) | (E)(F)(G)(H) |
| 20 | 60 | (E)(F)(G)(H) | (E)(F)(G)(H) |
| 40 | 50 | (C)(D)(E)(F) | (C)(D)(E)(F) |
| 60 | 40 | (C)(D)(E)(F) | (C)(D)(E)(F)(G)(H) |
| 80 | 30 | (A)(B)(C)(D) | (A)(B)(C)(D)(E)(F) |
| 90 | 20 | (A)(B)(C)(D) | (A)(B)(C)(D)(E)(F) |

DISPLAY CONTROL APPARATUS

CROSS REFERENCE TO RELATED APPLICATION

This application claims priority to and the benefit of Japanese Patent Application No. 2008-079894, filed Mar. 26, 2008, the entire subject matter and disclosure of which is incorporated herein by reference.

BACKGROUND

1. Technical Field

The present invention relates to a display control apparatus including a display unit with a touch panel.

2. Description of the Related Art

In recent years, a display control apparatus including a display unit with a touch panel having a sensor on a display so as to accept input through a touch operation on a screen of the display with a finger or a special pen is known. Since such a display control apparatus allows input operations by directly touching the screen, a direct and intuitive operation may be performed while visually identifying the screen.

Various types of touch panels included in display units with a touch panel are known. One type of the touch panel includes a capacitance touch switch using a capacitance sensor. The switch detects operational input while changing detection sensitivity from a high to low level. A touch operation may be reliably detected even when a thick glove is worn or when a finger is not covered by a glove.

The known display control apparatus including a display unit with a touch panel may intends to reliably detect a touch operation to a touch panel on the assumption that an installation location of a display unit with the touch panel in a display control apparatus is fixed. Specifically, sensitivity of a capacitance sensor is adjusted to compensate for a difference in a capacity change caused by existence of a glove etc. covering a finger reaching to the touch panel or thickness and material of the glove etc. being worn.

However, in a display control apparatus which allows a display unit with a touch panel to be connected to a plurality of locations on the display control apparatus or in different orientations, a direction and an amount of displacement of a contact area and a position of a finger during a touch operation generally differ for each installation location or each orientation of the display unit with the touch panel. For example, when a touch panel standing at an angle to a horizontal surface is operated from above, a contact area of a finger during a touch operation may become smaller than that on a touch panel placed flat on the horizontal surface. Moreover, when the touch panel is placed at a location higher or lower than an eye line of an operator, a contact position of the finger during the touch operation may be lower or higher than an intended contact position of the finger.

According to the known display control device, conditions such as a detection region and a detection area to detect the touch operation are fixed regardless of the installation location or the orientation of the touch panel. Therefore, the difference in the contact area of the finger or the displacement of the contact position during such a touch operation may cause a problem of not being able to reliably detect a touch operation on the display control apparatus which allows the display unit with a touch panel to be connected to a plurality of locations on the display control apparatus or in different orientations.

SUMMARY

A need has arisen to provide a display control apparatus which may increase reliability of detecting touch operations irrespective of the location or the orientation of the display unit with the touch panel connected to the display control apparatus.

A display control apparatus according to an embodiment of the invention comprises a main body and a display unit. The display unit includes a touch panel capable of being disposed at a plurality of locations or in a plurality of orientations with respect to the main body. The display control apparatus further comprises a memory that stores a plurality of detection condition parameters for detecting a touch operation to the touch panel. The plurality of detection condition parameters are corresponding to each of the plurality of locations or the plurality of orientations. The display control apparatus further comprises a state detector that detects a current location of the touch panel among the plurality of locations or a current orientation of the touch panel among the plurality of orientations. The display control apparatus still further comprises a condition selector that selects one of the plurality of detection condition parameters, corresponding to the current location or the current orientation detected by the state detector, from the plurality of detection condition parameters stored in the memory. Moreover, the display control apparatus comprises a touch determiner that determines a touch to the touch panel by using the selected one of the plurality of detection condition parameters.

BRIEF DESCRIPTION OF THE DRAWINGS

FIG. 9 shows an example of a table of the detection condition parameters of the touch operations according to an orientation.

DESCRIPTION OF THE PREFERRED EMBODIMENTS

Figure 1:
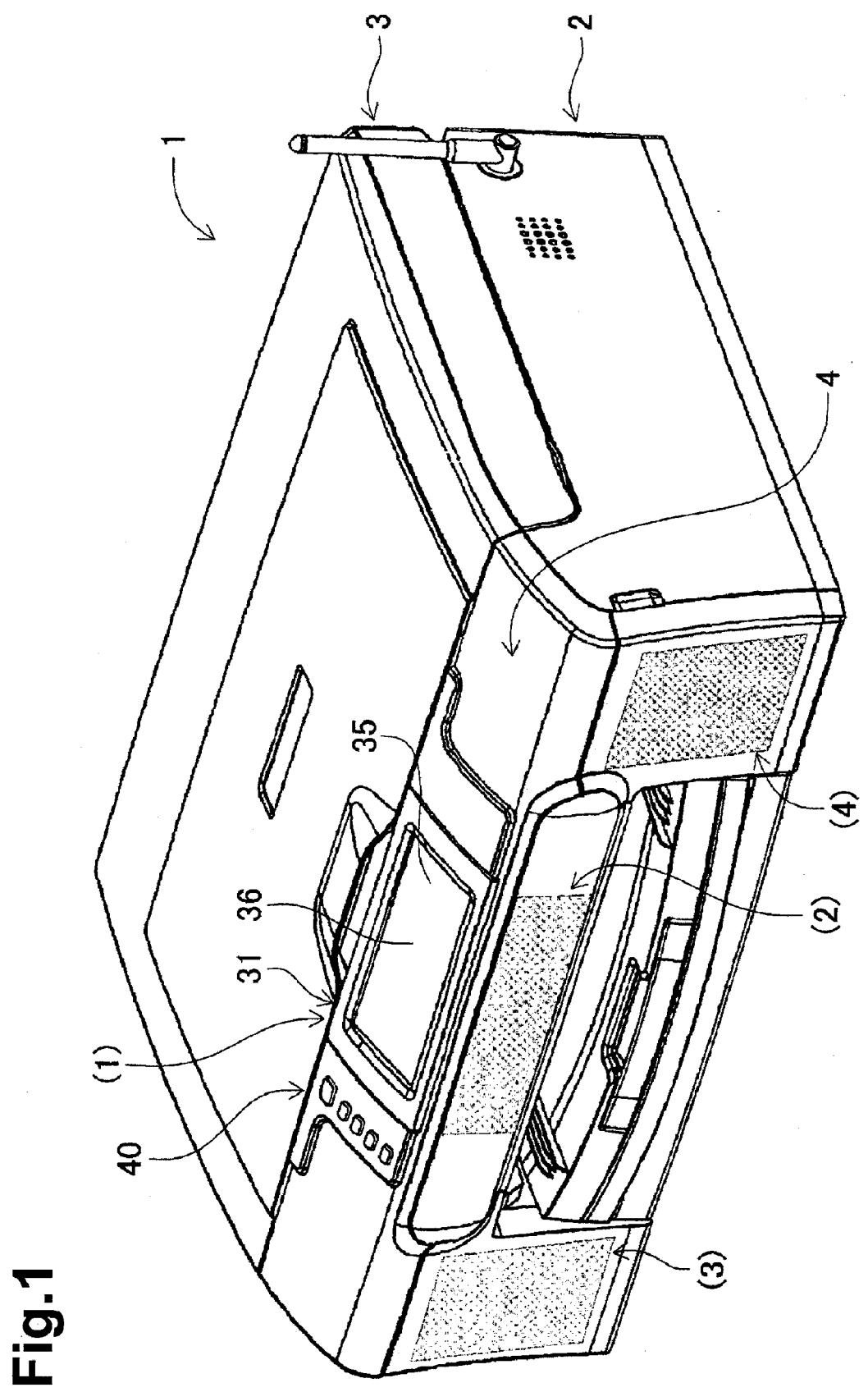
FIG. 1 shows a perspective view of a display control apparatus in accordance with first embodiment.
Figure 2:
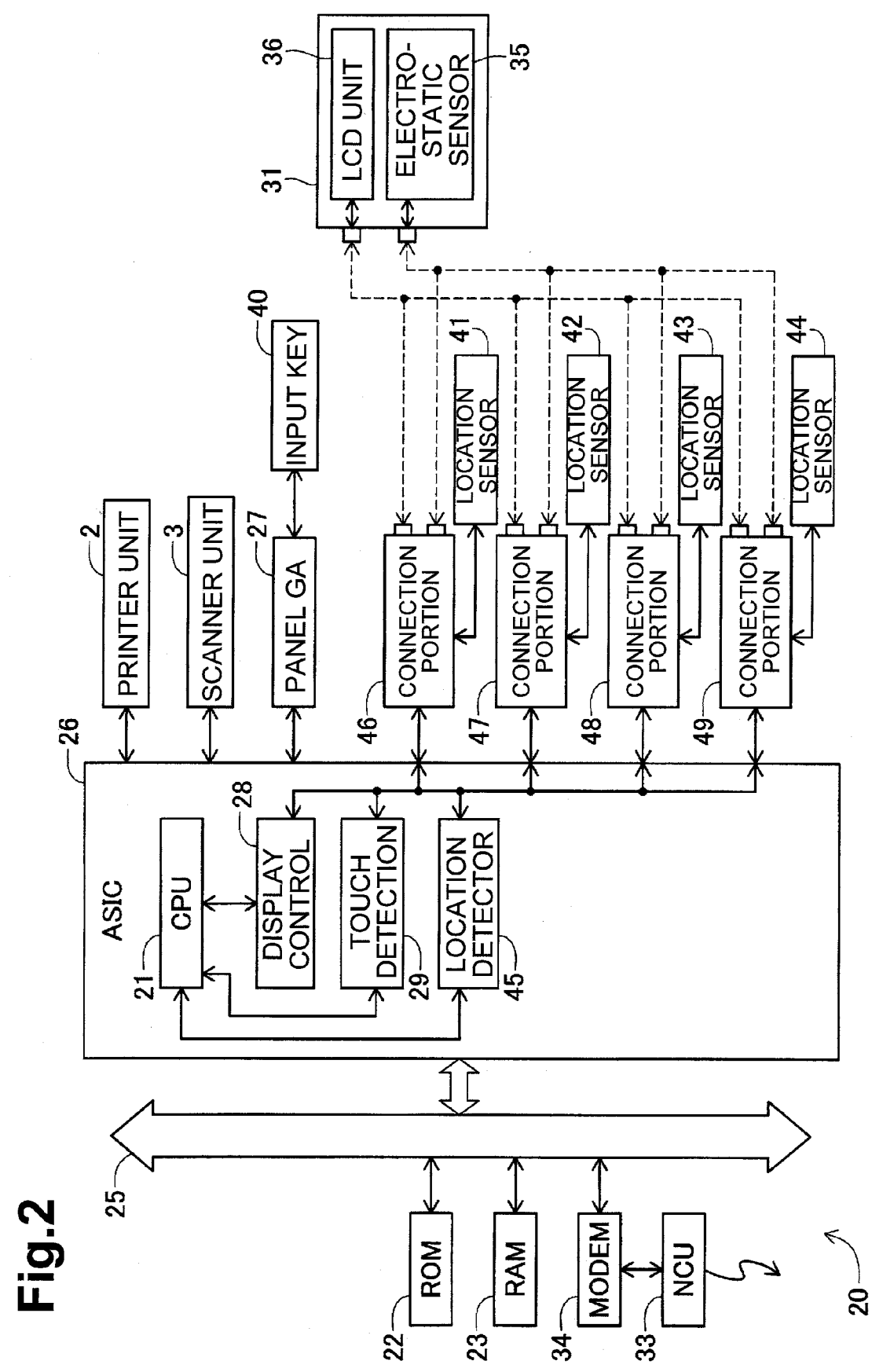
FIG. 2 shows a system structure of first embodiment.

FIG. 1 shows the outer structure of a display control apparatus 1 in accordance with first embodiment. FIG. 2 shows the system structure of the display control apparatus 1. A liquid crystal touch panel unit 31 can be connected to a plurality of locations on the display control apparatus 1.

The display control apparatus 1 includes a printer unit 2, such as an ink-jet printer, and a scanner unit 3 at a lower part and an upper part of a frame. The liquid crystal touch panel unit 31 equipped with an electrostatic sensor 35 on a liquid crystal display section 36 is placed in the center of an operation panel section 4, that is a location (1). In this embodiment, three more locations of the liquid crystal touch panel unit 31 are provided in addition to the location (1). The three locations include, at the lower front face of the frame, a location (2) located in the upper center part of the front face, a location (3) located in the left part of the front face, and a location (4) located in the right part of the front face. The liquid crystal touch panel unit 31 is removable and can be disposed at any of the locations (1), (2), (3) and (4).

Input keys 40 include a power key for instructing the display control apparatus 1 to be turned on, for example. Various instructions can be given to the display control apparatus 1 by operating the input keys 40.

The system structure of the display control apparatus 1 will now be described with reference to FIG. 2. FIG. 2 shows an example of a system structure of the display control apparatus 1. An ASIC (Application Specific Integrated Circuit) 26 centrally performs control processing in order to perform various kinds of functions of the display control apparatus 1 in accordance with instructions from a CPU 21. The ASIC 26 is connected to a ROM 22, a RAM 23, and a MODEM 34 via an external bus 25. An NCU 33 is connected to the MODEM 34. The printer section 2 and the scanner section 3 are connected to the ASIC 26. The input keys 40 are connected to the ASIC 26 via a panel gate array (panel GA) 27. The panel gate array (panel GA) 27 controls operations for sending key signals to the ASIC 26 in accordance with operation of the input keys 40.

The liquid crystal touch panel unit 31 includes an electrostatic sensor 35 including transparent electrodes (not shown) and the liquid crystal display section 36 disposed under the electrostatic sensor 35. The liquid crystal touch panel unit 31 is connected to any one of connection portions (1) 46, (2) 47, (3) 48 and (4) 49, each of which is provided for each of the locations (1), (2), (3) and (4) respectively. The connection portions (1) 46, (2) 47, (3) 48 and (4) 49 are connected to a display control portion 28, a touch detection portion 29, and a location detector 45 provided within the ASIC 26. The display control portion 28, the touch detection portion 29, and the location detector 45 are connected to the CPU 21. Location sensors (1) 41, (2) 42, (3) 43 and (4) 44 are connected to the connection portions (1) 46, (2) 47, (3) 48 and (4) 49, respectively.

The electrostatic sensor 35 of the liquid crystal touch panel unit 31 is connected to the touch detection portion 29 via any one of the connection portions (1) 46, (2) 47, (3) 48 and (4) 49. The liquid crystal display section 36 of the liquid crystal touch panel unit 31 is connected to the display control portion 28 via any one of the connection portions (1) 46, (2) 47, (3) 48 and (4) 49. The location sensors (1) 41, (2) 42, (3) 43 and (4) 44 are connected to the location detector 45 via the connection portions (1) 46, (2) 47, (3) 48 and (4) 49, respectively. When a user touches a desired position on the electrostatic sensor 35 while looking at the display of the liquid crystal display section 36, the touch detection portion 29 detects touched coordinates and outputs a touch position signal to the CPU 21.

In this process, the touch detection portion 29 detects touch operations on the basis of detection sensitivities and detection regions which are set according to the location of the liquid crystal touch panel unit 31 detected by the location sensor (1) 41, (2) 42, (3) 43 and (4) 44 and the location detector 45. A program for selecting one of detection condition parameters of the touch operations in accordance with the location of the liquid crystal touch panel unit 31 will be mentioned later.

The display control portion 28 controls the screen display of the liquid crystal display section 36 in accordance with the instructions from the CPU 21 in order to display various kinds of information related to the functions performed by the display control apparatus 1 on the liquid crystal display section 36.

The location detector 45 detects that each of the connection portions (1) 46, (2) 47, (3) 48 and (4) 49 is connected to the liquid crystal touch panel unit 31 on the basis of the signal from each of the location sensors (1) 41, (2) 42, (3) 43 and (4) 44 respectively.

The NCU (Network Control Unit) 33 is connected to the MODEM 34 to control facsimile communication. The MODEM 34 is connected to the ASIC 26 via the external bus 25.

The ROM 22 stores various kinds of execution programs and data. An example of one of the execution programs is a program for selecting the detection conditions of the touch operations according to the location of the liquid crystal touch panel unit 31 (shown in FIG. 3). An example of the data is a table of detection condition parameters for detecting the touch operations according to the location of the liquid crystal touch panel unit 31.

The RAM 23 is a workspace to load the execution program and maintain calculated result data obtained while executing the program or as a result of a program execution when the CPU 21 executes the various kinds of execution programs stored in the ROM 22.

Figure 3:
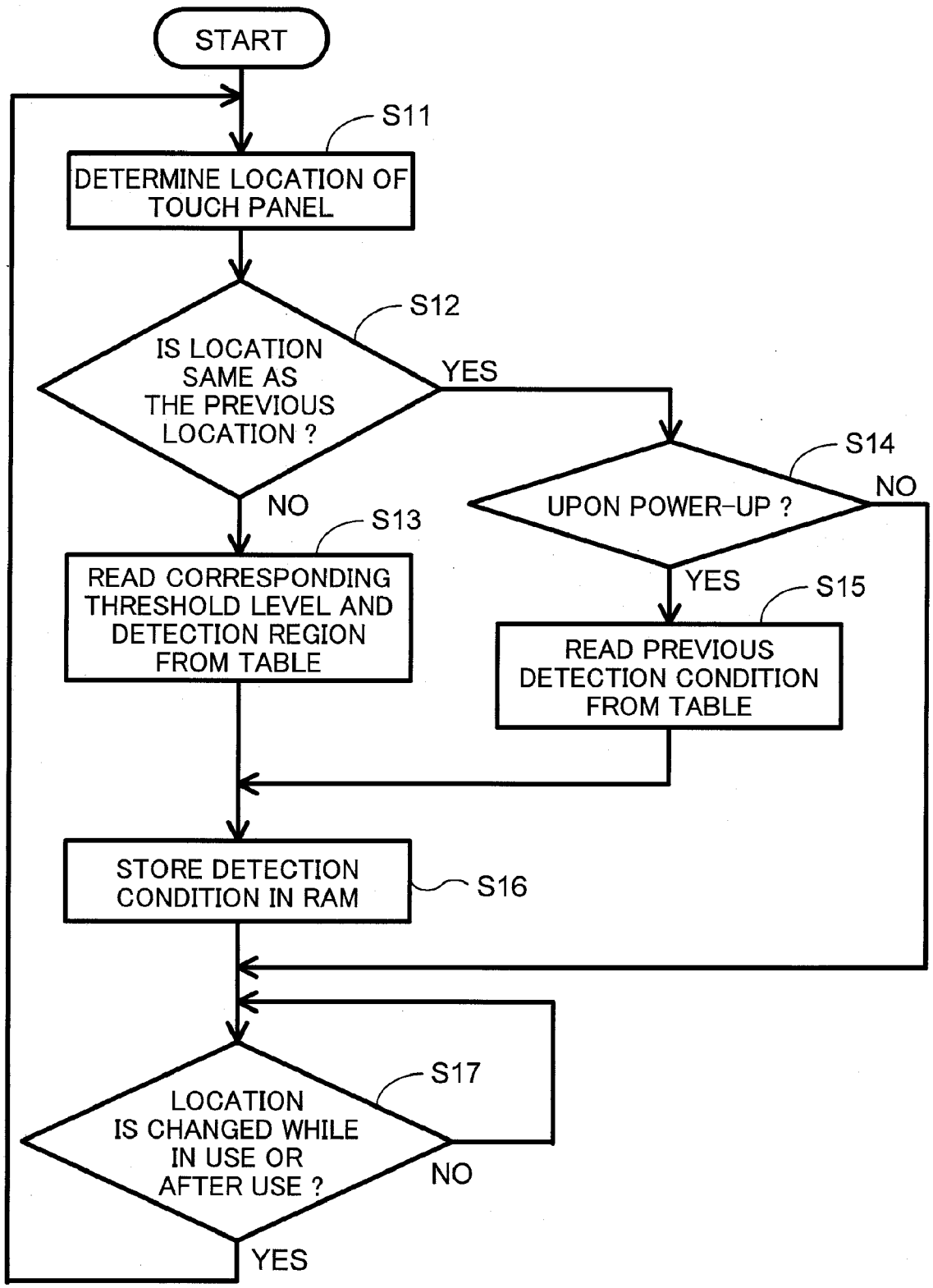
FIG. 3 shows a flow chart indicating a processing of detection condition parameters.

Hereinafter, operations of the program for selecting one of the detection condition parameters of the touch operations according to the location of the liquid crystal touch panel unit 31 will be described (shown in FIG. 3).

The location of the liquid crystal touch panel unit 31 of the display control apparatus 1 can be changed to any one of the locations (1), (2), (3) and (4) when no electric power is supplied. Upon power-up, the program for selecting one of the detection condition parameters of the touch operation according to the location of the liquid crystal touch panel unit 31 shown in FIG. 3 is activated and detects the location of the touch panel 31 in order to select one of the detection condition parameters of the touch operation according to the detected location.

When the program is activated, the location sensors (1) 41, (2) 42, (3) 43 and (4) 44 and the location detector 45 determine the location of the liquid crystal touch panel unit 31 (S11). Subsequently, the CPU 21 judges whether the detected location is the same as the previous location (S12). For example, in Step (S12), the latest location is always maintained at a storage area (not shown) which is not erased even if the power is turned off, and upon power-up the previous location is compared with the location determined when activating the program. When the locations are different (S12: NO), one the detection condition parameters, e.g., a detection threshold (an example of a parameter of sensitivity) and detection region which are set for the corresponding location are selected and read from the table (shown in FIG. 5) of the detection condition parameters of the touch operation, according to the locations, stored in the ROM 22 (S13).

Figures 4, 5, 6:
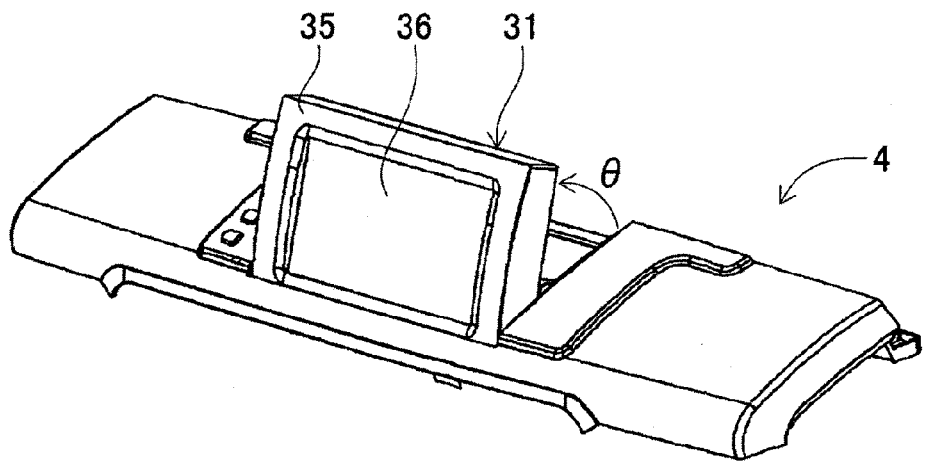
FIG. 4 shows detection regions of the touch panel.
FIG. 5 shows an example of a table of the detection condition parameters of the touch operations according to a location.
FIG. 6 shows a partial perspective view of the display control apparatus in accordance with second embodiment.

FIG. 5 shows an example of a detection condition parameter table for the touch operations for each of the locations. FIG. 4 shows an example of a detection region map for the electrostatic sensor 35 of a button displayed on the liquid crystal display section 36. In FIG. 4, a display region of one button is divided into eight regions (A), (B), (C), (D), (E), (F), (G) and (H) in order to control the detection region of the touch operations. The detection region herein means a region in which detection of touch operations is to be performed, and the electrostatic sensor 35, for example, is placed at each section of the region. By selecting the detection condition parameter for one region or by combining a plurality of the regions, the detection region of the touch operations for the same button can be changed. Moreover, concerning the touch operations performed at each of the region, the sensitivity for the touch operation can be adjusted by changing a threshold signal level to detect electric information, such as a voltage, outputted from the electrostatic sensor provided at each section of the region.

In FIG. 4, the sections (C) and (D) located in the center of the display region of the button are assigned areas larger than the other sections (A), (B), (E), (F), (G), and (H) of the region. Assigning larger areas to the sections (C) and (D) in the center of the region is considered reasonable since users are expected to touch the center of the display region when touching the button.

In FIG. 5, the values 20, 50, 50, and 50 are stored as a detection threshold level of the touch operations for each of the locations (1), (2), (3) and (4). A lower detection threshold level herein means that lower signal levels can be detected and that the detection sensitivity is high. Moreover, two types of settings are stored for the detection region. In a first setting, four regions (E), (F), (G) and (H) located at the lower part of the display position of the button are set as the detection region of the location (1) and four regions (C), (D), (E) and (F) located in the center of the display position of the button are set as the detection region of the locations (2), (3) and (4). In a second setting, six regions (C), (D), (E), (F), (G) and (H) from the center to the lower part of the display position of the button are set as the detection region of the location (1) and four regions (C), (D), (E) and (F) in the center of the display position of the button are set as the detection region of the locations (2), (3) and (4). Thus, the first setting provides the detection region with different positions according to the locations. In addition, the second setting provides the detection region with different positions and sizes according to the location. In this manner, the detection region may be selected as a detection condition parameter for the process at Step (S13) as shown in the first setting. Moreover, the detection region may be selected as shown in the second setting. In addition, a choice of whether to use the first or second setting may be given to users.

The table of FIG. 5 shows a table of the detection condition parameters. Higher detection sensitivity is provided and the detection region is shifted to the front side of the display control apparatus 1 at the location (1) (in the case of the first setting) or a larger detection region is set (in the case of the second setting).

When the determined location is the same as the previous location (S12: YES), the CPU 21 judges whether the process is performed upon power-up (S14). When the process is performed upon power-up (S14: YES), the previous detection condition parameter is read from the table (FIG. 5) according to the location.

The detection condition read at Step (S13) or Step (S15) is maintained at the RAM 23 (S16) and may also be stored in a non-volatile memory (not shown).

Then, while the process of the display control apparatus 1 is continued, the location detector 45 detects whether the location of the liquid crystal panel unit 31 has been changed with the electric supply to the display control apparatus 1 maintained (S17). This can be detected if the electric supply to the liquid crystal panel unit 31 and the connection portions (1) 46, (2) 47, (3) 48 and (4) 49 thereof is configured to be temporarily stopped while the electric supply to the body of the display control apparatus 1 is maintained.

If a change of the location is detected (S17: YES), the CPU 21 returns to Step (S11) and reads again the connection condition corresponding to the location. While no change of the location is recognized (S17: NO), the process for detecting a change of the location is continued (S17).

Next, second embodiment of the display control apparatus 1 will be described. A function to change a gradient angle (an example of an orientation) of a liquid crystal touch panel unit 31 when being connected to the display control apparatus 1 is provided. That is, the gradient angle can be changed when the liquid crystal touch panel unit 31 is connected.

FIG. 6 shows the liquid crystal touch panel unit 31 located at the operation panel section 4 of the display control apparatus 1 in a standing state. The gradient angle θ to the operation panel section 4 can be freely adjusted by users. Descriptions of an electrostatic sensor 35 and a liquid crystal display section 36 are the same as those of first embodiment (shown in FIG. 1) and, therefore, will be omitted.

Figure 7:
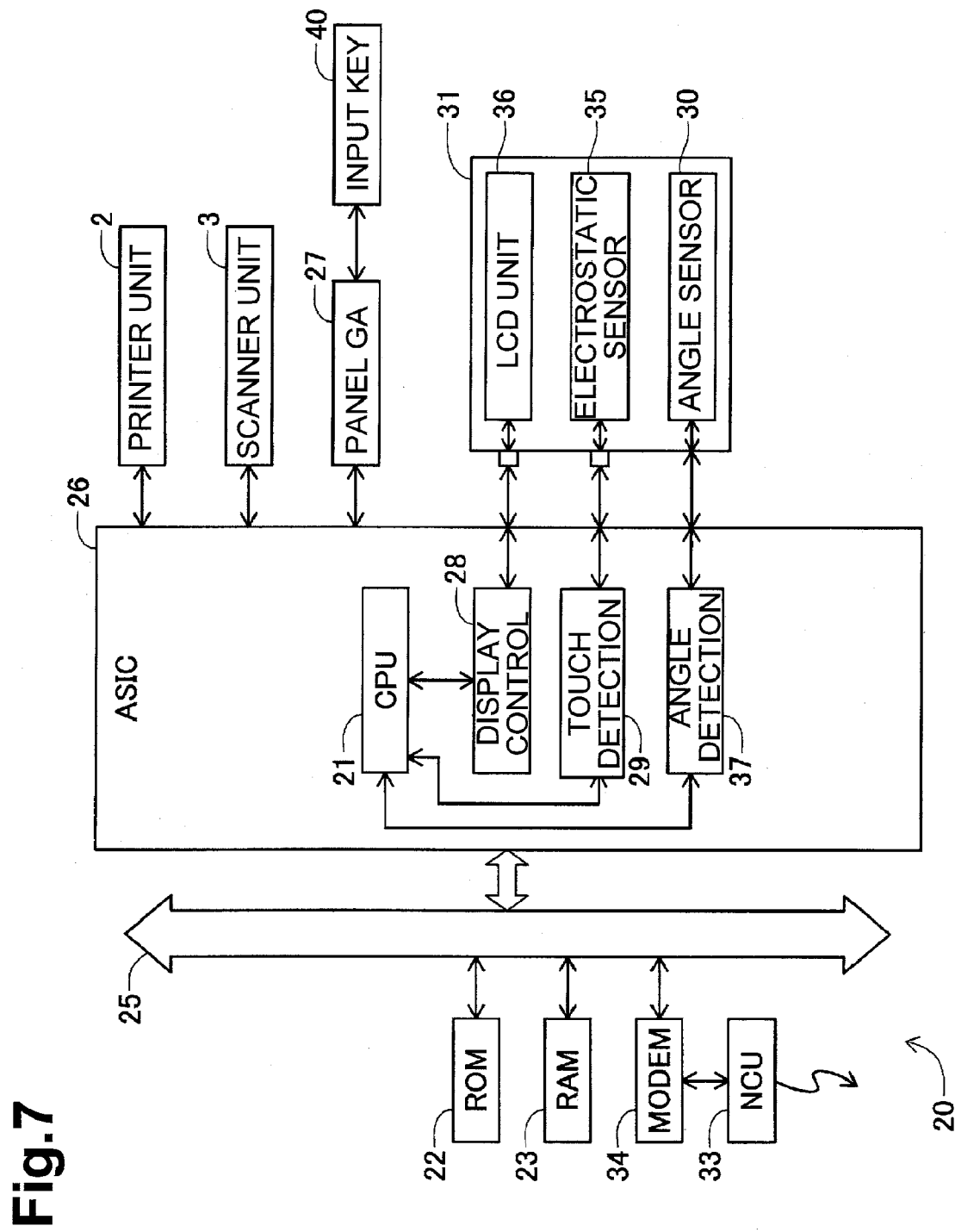
FIG. 7 shows a system structure of second embodiment.

The system structure of the display control apparatus 1 of second embodiment will now be described with reference to FIG. 7. The system structure of FIG. 7 includes a gradient angle detector 37 in place of the location detector 45 provided at the ASIC 26 in the system structure of first embodiment shown in FIG. 2, and an angle sensor 30 built in the liquid crystal touch panel unit 31 in place of the connection portions 46, 47, 48 and 49 and the location sensors 41, 42, 43 and 44. The liquid crystal display section 36, the electrostatic sensor 35, and the angle sensor 30 built in the liquid crystal touch panel unit 31 are connected to a display control portion 28, a touch detection portion 29, and the angle detector 37, respectively. Other structures are the same as those of the system structure of first embodiment (shown in FIG. 2) and, therefore, descriptions thereof will be omitted herein.

The liquid crystal touch panel unit 31 is located at the operation panel section 4 of the display control apparatus 1 in a standing state, and the gradient angle θ is adjustable.

The electrostatic sensor 35 of the liquid crystal touch panel unit 31 is connected to the touch detection portion 29. The liquid crystal display section 36 of the liquid crystal touch panel unit 31 is connected to the display control portion 28. The angle sensor 30 of the liquid crystal touch panel unit 31 is connected to the angle detector 37. The angle sensor 30 may include a volume (not shown) that outputs a voltage corresponding to the gradient angle θ. The volume may comprises one of axes about which the liquid crystal touch panel unit 31 is rotates. When a user touches a desired position on the electrostatic sensor 35 while looking at the display of the liquid crystal display section 36, the touch detection portion 29 detects the touched coordinates and outputs a position signal to a CPU 21.

In this process, the touch detection portion 29 detects touch operations on the basis of the detection sensitivity and the detection region which have been set in accordance with the gradient angle θ of the liquid crystal touch panel unit 31 detected by the angle sensor 30. A program for selecting one of the detection condition parameters (shown in FIG. 8) of the touch operations according to the gradient angle θ (an example of an orientation) of the liquid crystal touch panel unit 31 will be mentioned later.

Figure 8:
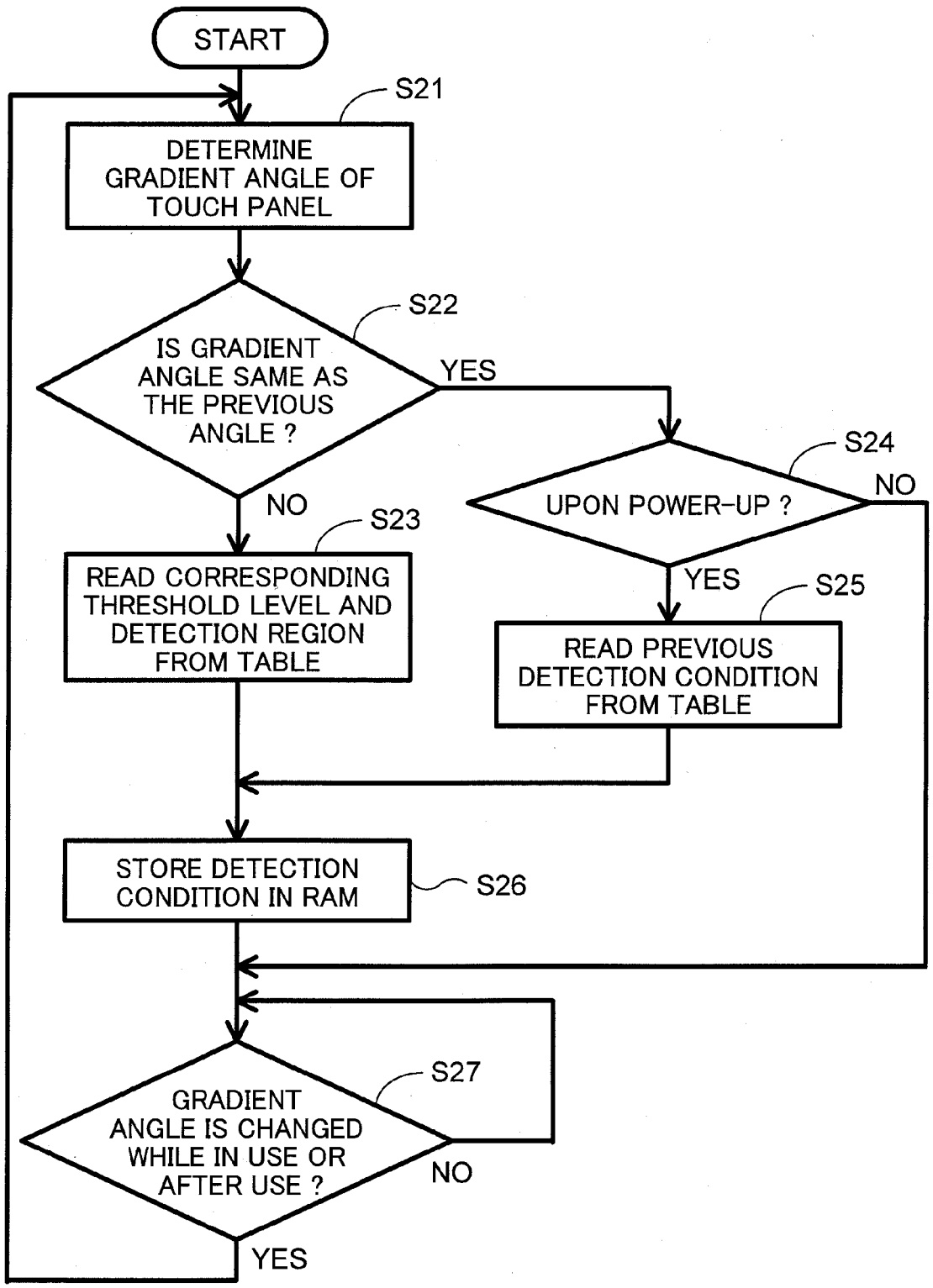
FIG. 8 shows a flow chart indicating a processing of detection conditions of the touch operations according to an orientation of the liquid crystal touch panel unit.

Hereinafter, the program for selecting one of the detection condition parameters of the touch operations according to the gradient angle θ of the liquid crystal touch panel unit 31 will be described (shown in FIG. 8). In first embodiment (shown in FIG. 3), the one of the detection condition parameters of the touch operation is selected according to the location of the liquid crystal touch panel unit 31. In the flowchart of FIG. 8, the one of the detection condition parameters is selected according to the gradient angle θ (an example of an orientation) in place of the location of the liquid crystal touch panel unit 31.

The gradient angle θ of the liquid crystal touch panel unit 31 of second embodiment can be appropriately changed. When the program is activated upon power-up etc., the angle detector 37 determines the gradient angle θ of the liquid crystal touch panel unit 31 (S21). Subsequently, the CPU 21 judges whether the determined gradient angle θ is the same as the previous gradient angle θ (S22). When the gradient angles θ are different (S22: NO), the detection conditions concerning the detection threshold (sensitivity) and the detection region which are set for the corresponding gradient angle θ are selected and read (S23) from the table (shown in FIG. 9) of the detection condition parameters of the touch operations, in accordance with the gradient angle θ, stored in the ROM 22.

FIG. 9 shows an example of the table of detection condition parameters of the touch operation for each of the gradient angles θ. The gradient angles θ of range from 10 degrees to 90 degrees and the values from 70 to 20 as the detection threshold levels of the touch operation are stored. Moreover, two types of settings are stored for the detection region. In a first setting, four regions (E), (F), (G) and (H) located at the lower pair of the display position of the button are set as the detection region when the gradient angles θ are 10 degrees and 20 degrees, and four regions (C), (D), (E) and (F) in the center of the display position of the button are set as the detection region when the gradient angles θ are 40 degrees and 60 degrees, and four regions (A), (B), (C) and (D) located at an upper part of the display position of the button is set as the detection region when the gradient angles θ are 80 degrees and 90 degrees. In a second setting, four regions (E), (F), (G) and (H) located at the lower part of the display position of the button are set as the detection region when the gradient angles θ are 10 degrees and 20 degrees, and four regions (C), (D), (E) and (F) in the center of the display position of the button are set as the detection region when the gradient angle θ is 40 degrees, and six regions (C), (D), (E), (F), (G) and (H) from the center to the lower part of the display position of the button are set as the detection region when the gradient angle θ is 60 degrees, and six regions (A), (B), (C), (D), (E) and (F) from the upper part to the center of the display position of the button are set as the detection region when the gradient angles θ are 80 degrees and 90 degrees. Thus, in the same manner as in first embodiment, the first setting provides the detection region with different positions in accordance with the gradient angle. In addition, the second setting provides the detection region with different positions and sizes in accordance with the gradient angle. In this manner, the detection region may be selected as detection condition parameters at Step (S23) as shown in the first setting. Moreover, the different positions and sizes of the detection region may be set as shown in the second setting. In addition, a decision of whether to use the first or second setting may be given to users.

The table of FIG. 9 shows detection conditions under which the touch operations are assumed to be ineffective as the gradient angle θ of the liquid crystal touch panel unit 31 increases and the touch positions are assumed to be focused on the upper part of the button display. As the gradient angle θ increases, a higher detection sensitivity is provided, and at the same time, the detection region is shifted to the upper side of the button display (in the case of the first setting), or the detection region is shifted to the upper side of the button display, and at the same time, a larger detection region is set (in the case of the second setting).

When the determined gradient angle θ is the same as the previous gradient angle θ (S22: YES), the CPU 21 judges whether the process is performed upon power-up (S24). When the process is performed upon power-up (S24: YES), the previous detection condition is read from the table (shown in FIG. 9) in accordance with the gradient angle θ.

The detection condition read at Step (S23) or Step (S25) is maintained in the RAM 23 (S26) and may also be stores in a non-volatile memory (not shown).

Then, while the process of the display control apparatus 1 is continued, the angle detection section 37 detects whether the gradient angle θ of the liquid crystal panel unit 31 has been changed with the electric supply to the display control apparatus 1 maintained (S27). In second embodiment, although the electricity can be supplied to the liquid crystal panel unit 31 and the connection portion 32 thereof while the electric supply to the body of the display control apparatus 1 is maintained, the electric supply to the liquid crystal panel unit 31 and the connection portion 32 thereof may be temporarily stopped while the electric supply to the body of the display control apparatus 1 is maintained.

If a change of the gradient angle θ is detected (S27: YES), the CPU returns to Step (S21) and reads again one of the detection condition parameters corresponding to the gradient angle θ. While no change of the gradient angle θ is recognized (S27: NO), the process for detecting a change of the gradient angle θ is continued (S27).

As described in detail above, according to first embodiment, when the liquid crystal touch panel unit 31 can be connected to a plurality of locations (1), (2), (3) and (4), the table (shown in FIG. 5) of the detection condition parameters of the touch operation according to the locations (1), (2), (3) and (4) is stored at the ROM 22; therefore, the detection sensitivity (threshold level of signals) of the touch operation and the detection region on the button display to accept touch inputs, etc. can be optimized for the locations (1), (2), (3) and (4) of the liquid crystal touch panel unit 31. Even when characteristics of the touch operation are different for each of the locations (1), (2), (3) and (4), the touch operations can be reliably detected irrespective of the difference of the locations (1), (2), (3) and (4). Therefore, the operability of the touch panel in the display control apparatus may be improved.

In this case, the display control apparatus 1 is provided with a plurality of connection portions (1) 46, (2) 47, (3) 48 and (4) 49, to which the liquid crystal touch panel unit 31 can be connected. Thereby, the location of the liquid crystal touch panel unit 31 can be detected based on which of the connection portions (1) 46, (2) 47, (3) 48 and (4) 49 is connected.

In this case, the detection condition parameter, e.g., the detection threshold (sensitivity) and the detection region which are set for each of the detected location is selected and read from the table (shown in FIG. 5) of the detection condition parameters of the touch operation, in accordance with the locations, stored in the ROM 22. In the display control apparatus 1 which allows the liquid crystal touch panel unit 31 to be connected to a plurality of connection portions (1) 46, (2) 47, (3) 48 and (4) 49, the location of the liquid crystal touch panel unit 31 is automatically detected and one of the plurality of detection condition parameters is set according to the location; therefore, the touch operation may be reliably detected irrespective of the location of the liquid crystal touch panel unit 31.

In addition, according to second embodiment, when the gradient angle θ of the liquid crystal touch panel unit 31 can be changed, the table (shown in FIG. 9) of the detection condition parameters of the touch operation according to the gradient angle θ is stored in the ROM 22; therefore, the detection sensitivity (threshold level of signals) in the touch operations and the detection region on the button display to accept touch inputs, etc. can be optimized on the basis of the gradient angle θ of the liquid crystal touch panel unit 31. Even when characteristics of the touch operations are different for each of the gradient angles θ, the touch operations may be reliably detected irrespective of the difference in the gradient angle θ. Therefore, the operability of the touch panel in the display control apparatus may be improved.

In this case, the detection condition parameters, e.g., the detection threshold (sensitivity) and the detection region for the detected gradient angle θ is selected and read from the table (shown in FIG. 9) of the detection condition parameters of the touch operation, in accordance with the gradient angle θ, stored in the ROM 22. The display control apparatus 1 (shown in FIG. 6) which allows the liquid crystal touch panel unit 31 to be located at the operation panel section 4 of the display control apparatus 1 in a standing state automatically detects the gradient angle θ of the liquid crystal touch panel unit 31 and selects the one of detection condition parameters according to the gradient angle θ; therefore, the touch operations may be reliably detected irrespective of the gradient angle θ of the liquid crystal touch panel unit 31.

As to the display button of the liquid crystal touch panel unit 31 in first and second embodiments, the display region is divided into a plurality of sections (for example, eight regions (A), (B), (C), (D), (B), (F), (G) and (H)) to control the detection region of the touch operations. An electrostatic sensor, for example, is placed at each region. By setting the detection condition with one region or by combining the regions, the position and dimensions of the detection region of the touch operation for the same button can be changed. Moreover, concerning the touch operation performed at each region, the sensitivity for the touch operation can be adjusted by changing the threshold signal level to detect electric information, such as a voltage, outputted from the electrostatic sensor provided at each region.

By absorbing differences in the characteristics of the touch operation caused by differences in the connection states during the touch operation, position information corresponding to the detection information appropriate for each state can be selected and set even when contact areas, contact conditions, etc. of fingers touching the liquid crystal touch panel unit 31 are different irrespective of the locations (1), (2), (3) and (4) of the liquid crystal touch panel unit 31 or the orientation, e.g., the gradient angle θ. In addition, the detection region can be appropriately selected and set. Therefore, the touch operation may be reliably detected irrespective of the locations (1), (2), (3) and (4) of the liquid crystal touch panel unit 31 or the gradient angle θ.

Moreover, by compensating for differences in the strength of the detection signals caused by differences in the characteristics of the touch operation, the touch operation may be reliably detected irrespective of the locations (1), (2), (3) and (4) of the liquid crystal touch panel unit 31 or the gradient angle θ.

The display control apparatus 1 which may includes both the locations (1), (2), (3) and (4) and the structure to detect the orientation, e.g., the gradient angle θ, and the one of detection condition parameters may be selected based both on the location and the orientation.

Moreover, in FIG. 4, although the detection region of the display button is divided into eight regions and the regions in the center are given larger areas, the number of regions of the button display and the size of each region can be appropriately changed.

In addition, setting of the threshold levels and setting of the detection region in the tables (in FIG. 5 and FIG. 9) can be appropriately optimized. Furthermore, a plurality of other detection condition parameters may be stored in the tables in addition to the first and second settings to allow users to select desired parameters. Moreover, statistics of touch positions, touch areas, and optimal touch sensitivities of the touch operations by users may be gathered to automatically change the settings based on the statistics. Thereby, misoperations of the touch panel may decrease and the operability may be improved.

What is claimed is:

1. A display control apparatus comprising:
    a main body;
    a display unit including a touch panel that is configured to be removably installed at a plurality of locations on the main body, the plurality of locations being spaced apart from each other on the main body;
    a memory that stores a plurality of detection condition parameters for detecting a touch operation to the touch panel, each of the plurality of detection condition parameters corresponding to each of the plurality of locations;
    a state detector that detects which one of the plurality of locations is a current location at which the touch panel is removably installed;
    a condition selector that selects one of the plurality of detection condition parameters from the plurality of detection condition parameters stored in the memory based on the detected one of the plurality of locations as the current location at which the touch panel is removably installed; and
    a touch determiner that determines a touch to the touch panel by using the selected one of the plurality of detection condition parameters.

2. The display control apparatus according to claim 1, further comprising a plurality of connectors configured to connect the touch panel to the main body at the plurality of locations,
    wherein the state detector comprises a connection detector that detects one of the plurality of connectors to which the touch panel is currently connected, and
    wherein the state detector detects the current location by detecting the one of the plurality of connectors to which the touch panel is currently connected.

3. The display control apparatus according to claim 1, wherein
    the touch panel is further configured to be disposed in a plurality of orientations with respect to on the main body;
    each of the plurality of detection condition parameters also correspond to the plurality of orientations;
    the state detector further detects a current orientation at which the touch panel is oriented from among the plurality of orientations; and
    the condition selector is further configured to select one of the plurality of detection condition parameters from the plurality of detection condition parameters stored in the memory based on the current orientation of the touch panel.

4. The display control apparatus according to claim 3, wherein the state detector comprises an angle detector that detects a gradient angle as the current orientation of the touch panel.

5. The display control apparatus according to claim 1,
    wherein the touch panel includes a plurality of regions and the detector is detectable the touch operation at each of the plurality of regions,
    wherein the plurality of detection condition parameters further includes detection region parameters indication the regions where the touch operation is to be detected, and
    wherein the touch determiner determines the touch operation to the regions of the touch panel by further using the detection region parameters.

6. The display control apparatus according to claim 1, wherein the touch panel is a capacitance type touch panel.

7. The display control apparatus according to claim 1, wherein the plurality of detection condition parameters includes threshold values to determine, for each of the plurality of locations or each of the plurality of orientations, whether the touch operation is executed or not.

* * * * *